Feb. 9, 1954
L. M. BUDD
2,668,568
EDGER AND FINISHER
Filed Nov. 30, 1951
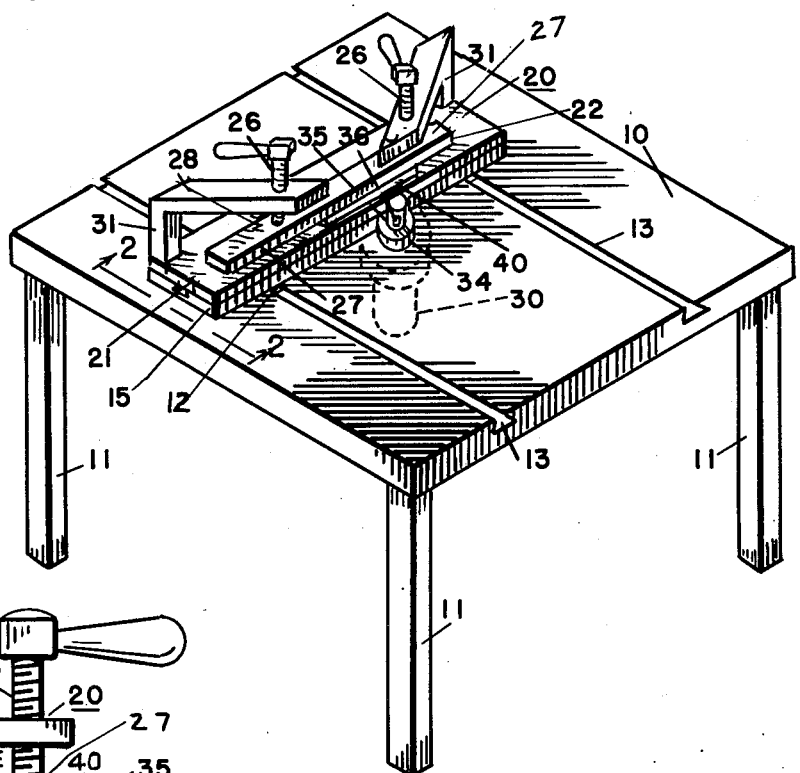
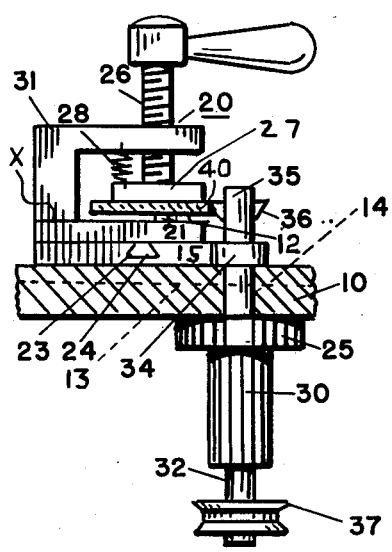
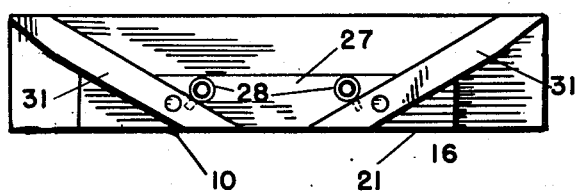
*INVENTOR.*
LENA M. BUDD
BY *Howard J. Whelan.*

Patented Feb. 9, 1954

2,668,568

UNITED STATES PATENT OFFICE 2,668,568

EDGER AND FINISHER

Lena M. Budd, Edgewood, Md.

Application November 30, 1951, Serial No. 259,082

1 Claim. (Cl. 144—134)

This invention relates to machine tools and more particularly to those usable for the planing, bevelling and cutting of plastic materials.

Plastic sheets and plastic materials in general are troublesome to cut and machine to a desirable finish due to the fact that saw or tool marks are usually left visible in the material and cannot be removed without considerable filing, smoothing and buffing work. Since it is ordinarily very important to have the edge surfaces of the plastic material smooth and free from scratches and tool marks, the development of a tool and the manner of operating it that will overcome this difficulty is a matter of considerable interest to plastic workers and manufacturers. The conventional tools and methods used for the same class of work in metal processing are not suitable for this purpose, especially when the work is not guided. The cutting of sheet plastic is commonly done by cutting with a circular or straight saw, and leaves a series of rough wave marks along the edge that has been cut that detract from its appearance. To remove these marks, this invention involves the use of a travelling carriage with fastenings to hold the piece of plastic to be treated firmly. A table supports the carriage and is so designed that the carriage may divert the held plastic sheet in any direction desired. An arbor is installed in the table with a travelling fly cutter rotatable on its axis and adapted to contact and smooth off and/or bevel the surface of the plastic that it is brought up against. A ball or roller bearing unit is axially and rotatively mounted on the arbor and runs on a rail. It holds the cutter in a definite plane in relation to the plastic surface and determines the depth of cutting done thereby. The arrangement enables the smoothing off to be accurately, effectively done and with the complete removal of all noticeable marks.

For a clearer understanding of the invention, the accompanying drawings illustrate a particular form of the invention by way of example, and are explained in detail in the following description, while the claim indicates the scope of the invention.

Referring to the drawings:

Figure 1 is a view in perspective embodying this invention;

Figure 2 is a sectional side elevation of the holder portion of the machine looking in the direction of arrows 2—2; and Figure 3 is a plan detail of the clamp used in this embodiment with the bolts removed from the brackets.

Similar reference characters refer to the same parts throughout the drawings.

In the particular form shown, a table 10 serves as a plane on which to mount a clamping device 20 on its upper surface, and to support a vertical arbor tool unit 30 through it. The table is preferably supported on legs 11. The upper face of the table is rectangular in contour and finished smooth. A pair of dovetail slots 13 extend parallel across the table top and serve to guide the travel of the dovetail lugs 12 on the clamp 20 in the longitudinal direction by means of the dovetail plate 15. A hole 14 is located approximately in the central area of the table and made to suit the arbor unit 30 fastened underneath and projecting through it. The structural features of the table are designed on conventional lines generally adopted for the handling of tool operations on it.

The clamp unit 20 is disposed transversely across the table 10 and consists of a flat upper plate 21 on which the plastic piece 40 to be worked on, is placed. This plate 21 rests on another similar and lower plate 15 which is provided with a slot 23 across it, in which a dovetail lug 24 attached to the upper plate 21 can slide transversely without permitting withdrawal. This lug and slot arrangement enables the plate 21 to be moved transversely across the table when the clamp is mounted thereon in normal position. The upper plate 21 is provided with a pair of corner brackets 31 integral therewith or welded thereto and extending angularly across the plate 21 and holding a pair of clamping bolts 26 screw-threaded therein near their ends. These bolts 26 screw through the brackets and contact a cross-bar 27 of rectangular cross section. Springs 28 are fastened at one end to the brackets 31 and the other end of the spring is attached to the cross bar 27 to raise it when the bolts are raised. When the bolts 26 are unscrewed upwardly, the cross-bar is resiliently suspended by the springs 28. Small vertical pins 12' extend up from the upper surface of the plate 21 to support the plastic sheet when clamped down on them by the bar 27. The plastic sheet 40 to be machined is placed on the pins 12 on the upper plate 21 and then clamped down by screwing down on the bolts 26 until they force the cross-bar 27 tightly against the sheet 40. The arbor unit 30 is held to the table 10 by a flange 25 on its housing and bolted onto the underneath surface of the table. It has a centrally located shaft 32 vertically positioned and projecting through and above the table level with a frictionless roller 34 around it and chuck 35 holding a two way or fly cutter 36, both of conventional type. A pulley 37 is mounted on the lower end of the shaft 32 and is connected to a suitable source of power, not shown, to rotate the shaft.

The plastic sheet 40 has its edge surface planed off by this device in the following manner. First the plastic sheet 40 is clamped flat and rigidly to upper plate 21, with a sufficient amount of it extended beyond the edge of the plate 21 to be planed off. The plates 21 and 15 are adjusted in the proper position for the work by their respective rails and lugs in the slots 13 and 23. This is done to bring the cutter 36 in alignment with the edge of the plastic sheet to be cut, and to place the roller 34 against the straight edge of the lower plate 15 to guide it. As the cutter rotates, the plate 21 is moved transversely so as to make its travel against the plastic sheet uniform and to suit its contour. This makes the resulting plastic surface smooth and removes the marks. The plastic piece is then unclamped and removed, and another piece put in its place. The cross bar 27 remains suspended on its springs 28 and allows another piece of plastic to be positioned, without handling and raising the bar. This feature saves time and effort in the placing and removal of the plastic sheet. The pins 12' enable the plastic sheet to be cut without the cutters striking the plate 21.

The device is designed for flexibility that permits the work clamped thereon to be moved in various directions easily and quickly. Its roller running on the rail offers little resistance to the travel of the cutter while at the same time keeping it aligned, positively. This assures of the proper cutting by the tool and the production of the smooth surface, provided of course that the tool is of the proper design. It eliminates the usual grinding and filing required to remove saw and machine marks from the ends of the plastic caused by cutting in the conventional manner, and at the same time acts quickly, conveniently and inexpensively.

While but one general form of the invention is shown in the drawings and described in the specification, it is not desired to limit this application for patent to this particular form, as it is appreciated that other forms of construction could be made that would use the same principles and come within the scope of the appended claim.

Having thus described the invention, what is claimed is:

A smoothing and edge chamfering machine for plastic sheet material, comprising a table, a shaft extending through said table, means for securing said shaft in rotatable position on said table, means below the table for rotating the shaft, a roller above the table secured to and rotating with the shaft, said table having a pair of parallel dovetail slots extending transversely of its upper face, work holding means translatable along said slots in the direction of the roller, said holding means including a base plate having a linear edge transverse to the slot and contacting said roller to be guided thereby, means for securing the plastic sheet material to the holding means, a cutting tool mounted on the shaft above the roller, said tool operating along one edge of the plastic sheet material parallel to the aforesaid linear edge on the base plate, wherein the work holding means include a plate resting on top of the plastic sheet material and clamps extending above and spaced from the said material, and spring connections between said last mentioned plate and clamps.

LENA M. BUDD.

References Cited in the file of this patent

UNITED STATES PATENTS

| Number | Name | Date |
|---|---|---|
| 114,720 | Sherman | May 9, 1871 |
| 500,167 | Surerus et al. | June 27, 1893 |
| 1,099,894 | Conrad | June 9, 1914 |
| 1,128,274 | Sinderson | Feb. 9, 1915 |
| 1,435,758 | Tate | Nov. 14, 1922 |
| 2,308,996 | Miller | Jan. 19, 1943 |
| 2,334,342 | Manteros | Nov. 16, 1943 |

FOREIGN PATENTS

| Number | Country | Date |
|---|---|---|
| 213,764 | Great Britain | Apr. 10, 1924 |